3,296,285
NOVEL-1(10)-13-ALKYL GONENES AND
PROCESS FOR THEIR MANUFACTURE
Theodore Legatt, Bloomfield, and Elliot L. Shapiro,
Cedar Grove, N.J., assignors to Schering Corporation,
Bloomfield, N.J., a corporation of New Jersey
No Drawing. Filed Nov. 7, 1963, Ser. No. 322,050
13 Claims. (Cl. 260—397.3)

This application is a continuation-in-part of co-pending applications Serial Nos. 252,068 and 296,924 of Theodore Legatt and Elliot L. Shapiro, filed January 17, 1963 and July 23, 1963, respectively, now abandoned.

This invention relates to compositions of matter identified as 3-keto-1(10)-dehydro-13-alkyl-5α-gonenes, intermediates leading thereto, and to processes for the manufacture of such compositions.

The invention sought to be patented in its composition aspect is described as residing in the concept of a chemical compound having a molecular structure in which there is attached to a 1(10)-13-alkyl-5α-gonene nucleus a keto, hydroxyl or lower alkanoyloxy group at C–3, a hydroxy or lower hydrocarbyloxy group at the 17β-position and in the 17α-position a member of the group consisting of lower alkyl, lower alkenyl, lower alkynyl and halogeno-lower alkynyl.

The invention sought to be patented in its process aspect is described as residing in the concept of deconjugating a 3-keto-13-alkyl-5α-1(2)-gonene by means of an alkali metal acetylide (sodium acetylide) in a solvent such as dimethylformamide or dimethylsulfoxide or with other reagents such as potassium tertiary butoxide in dimethylsulfoxide whereby the $\Delta^{1,2}$-bond is shifted to the 1(10)-position, and reducing the 3-keto to 3α or 3β-hydroxy as desired.

Other substituents may appear elsewhere in the nucleus. For example, a methyl group (α or β) may be present at the 6- and/or 16-positions, an oxygen function such as hydroxy or keto may be present at the 11-position; halogen may be present at one or more of the 6-, 9- and 11-positions. These nuclear substituents do not materially alter the general utility and usefulness of the unadorned molecular structure, differences noted being in degree rather than kind.

Our novel compounds containing a 17α-alkynyl group, as exemplified by 17α-ethinyl-5α-1(10)-estrene-17β-ol-3-one and 13-ethyl-17α-ethinyl-5α-1(10)-gonene-17β-ol-3-one, are physiologically active as antifertility agents when administered to the female of the species. Those compounds possessing a 17α-alkyl (such as 17α-methyl) or alkenyl (such as 17α-vinyl) are useful in metabolic application since they exhibit valuable anabolic/androgenic ratios. All of our novel compounds are valuable intermediates useful in the preparation of analogous 10-hydroperoxy-1(2)-estrenes as described in our copending application Serial No. 252,068, filed January 17, 1963, of which this application is a continuation-in-part.

Our novel 3-keto-13-alkyl-5α-1(10)-gonenes are prepared preferably by deconjugation of the corresponding 3-keto-13-alkyl-5α-1(2)-gonene effected by subjecting the latter to the action of an agent such as sodium acetylide for example. Some 3-keto-13-alkyl-5α-1(2)-gonenes are known in the art, i.e., 3-keto-1(2)-estrenes (3-keto-13-methyl-1(2)-gonenes). Others may be prepared from the corresponding 3-keto-13-alkyl-5α-gonene by bromination and dehydrobromination whereby the conjugated 1,2-double bond is introduced into the A-ring. The following reaction scheme depicts the general synthesis from 13-alkyl-5α-gonenes. Only the A-ring and part of the B-ring is shown since the remainder of the molecular structure does not enter into this reaction.

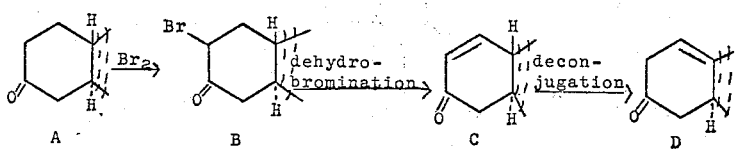

Representative of the alkyl groups at C–13 are lower alkyl groups such as methyl, ethyl, n and iso-propyl, n and iso-butyl and the like of which methyl and ethyl are preferred.

Representative of the substituents appearing in the 17α-position are lower alkyl such as methyl, ethyl, propyl (of which methyl and ethyl are preferred), lower alkenyl such as vinyl, allyl, and the like, lower alkynyl such as ethinyl, propargyl and halo-lower alkynyl such as chloroethinyl and trifluoromethylethinyl. The 17β-substituent is preferably hydroxy but may be also an ester of a hydrocarbon carboxylic acid having up to eight carbon atoms such as acetoxy, propionoyloxy, benzoyloxy and the like.

The bromination and dehydrobromination steps (A→B→C) are conventional as described in the art with the dehydrobrominating agent preferably being collidine or dimethylformamide in the presence of lithium carbonate. The deconjugation is effected by reacting C with sodium acetylide and dimethylformamide or dimethylsulfoxide under nitrogen or with other reagents such as potassium tertiary butoxide in dimethylsulfoxide whereby the 3-keto-13-alkyl-5α-1(10)-gonene is formed. In the foregoing reaction scheme, it is presumed that the C–17 substituents are already present as may be other nuclear substituents.

The end products, D, may also be made from a common precursor, namely, a 13-alkyl-5α-1(10)-gonene-3- ol-17-one (E) by the following sequence of reactions wherein W is lower alkyl:

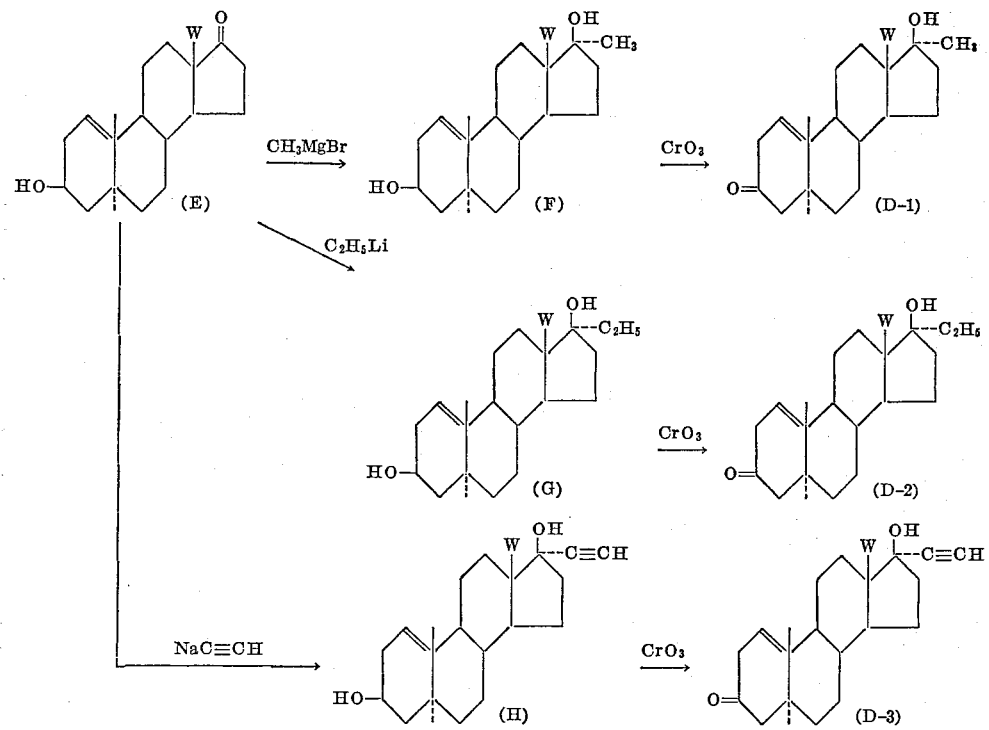

By reacting a 17-keto-13-alkyl-5α-gonene, E, with an appropriate reactant, a 17β-tertiary hydroxy steroid having the selected 17α-substituent (F, G and H) is formed. For example, the 17-keto estrene, E, upon reaction with a lower alkyl Grignard reagent, such as methylmagnesium bromide, is a known manner, is transformed into the corresponding 17α-methyl-17β-hydroxy analog, F; upon reaction with a lithium alkyl such as ethyl lithium, E, is transformed into the corresponding 17α-ethyl-17β-hydroxy analog, G; upon reaction with an acetylide such as sodium acetylide, E, is transformed into the corresponding 17α-ethinyl-17β-hydroxy analog, H. These intermediate substances, F, G and H, all containing in the A-ring the 5α-1(10)-dehydro-3-hydroxy configuration, are each subjected to oxidation such as with chromic acid whereby the 3-hydroxy group is converted to 3-keto resulting in the formation of the end products, D-1, D-2 and D-3, respectively.

In order to obtain the 13-higher homologs of the 1(10)-dehydro-5α-gonenes of our invention (i.e. compounds such as D-1, D-2 and D-3 wherein the lower alkyl group, W, has at least 2 carbon atoms) necessary A-ring saturated intermediates such as A′ shown below are prepared by acid treatment of either a 17-Z-3-methoxy-13-lower alkyl-2,5(10)-gonadiene (compound J) or a 17-Z-13-lower alkyl-5(10)-gonene-3-one (compound K) followed by a lithium in ammonia reduction of the 3-keto-13-alkyl-4-gonene (L) thereby produced. In the following sequence of reactions W is lower alkyl; Z′ is

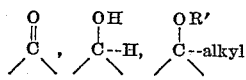

and Z is

wherein R is lower alkyl, lower alkenyl, lower alkynyl, halogenoethinyl, trifluoromethylethinyl and the like, and R′ is hydrogen, benzoyl and lower alkanoyl such as acetyl, propionyl, and the like.

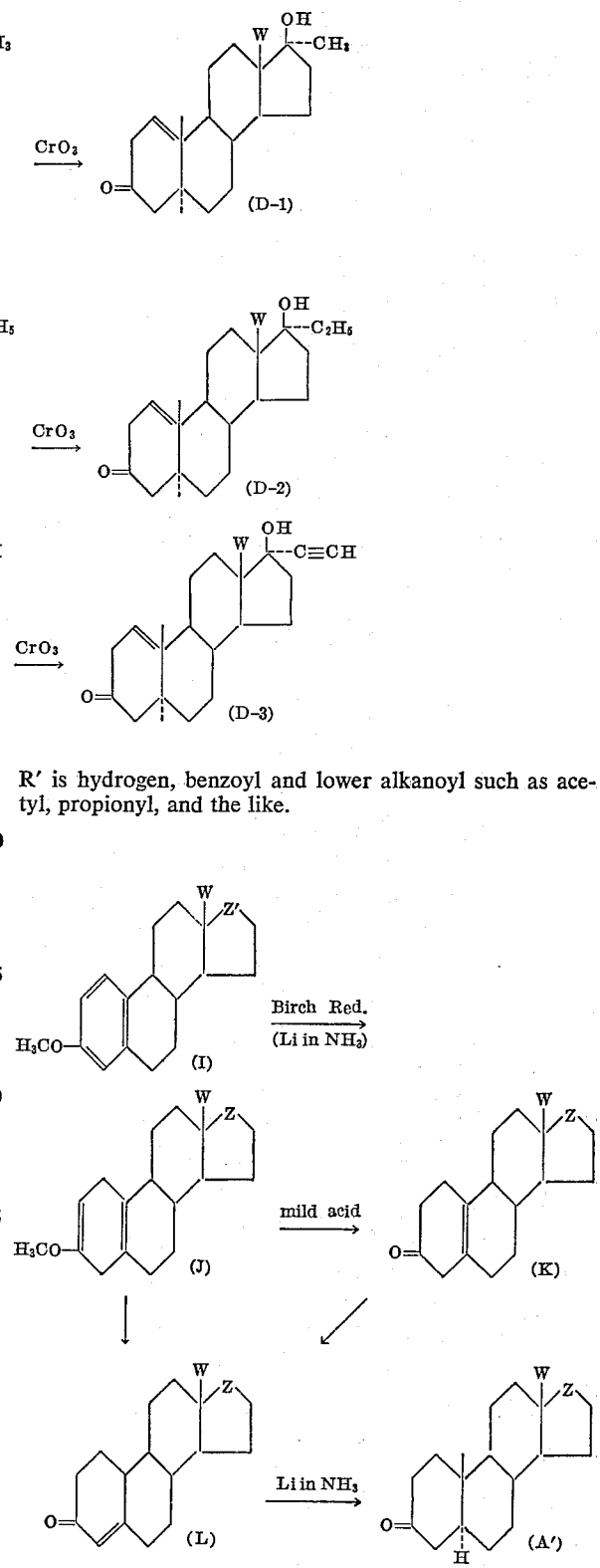

In the reaction scheme I → A′, the 13-alkyl-1,3,5(10)-gonatriene methyl ether (1), is of necessity limited in the variable Z since the Birch reduction will also affect reducible groups such as keto and alkynyl. When 1(10)-estrene-17β-ol-3-one in 60 ml. acetone (under an argon atmosphere) maintained at 5° C., add 0.6 ml. chromic acid solution (26 g. chromic anhydride, 23 ml. concentrated sulfuric acid all diluted to 100 ml. with water). After 10 minutes, pour reaction solution into water, and extract with methylene chloride. Wash the methylene chloride layer with water. Evaporate the methylene chloride layer under an argon atmosphere to a residue consisting substantially of 5α - 1(10) - estrene - 3,17-dione. Purify by crystallizing from acetone-hexane.

(E) *5α - 1(10) - estrene - 3α-ol-17-one and 5α-1(10)-estrene - 3β - ol - 17 - one.*—Add a solution of 2.2 g. of 5α-1(10)-estrene-3,17-dione in 50 ml. methanol dropwise to a solution of 90 mg. of sodium borohydride, 12 ml. of methanol, and 3 ml. of water. After 25 minutes, add water and extract the resulting mixture with methylene chloride. Evaporate the methylene chloride layer to a residue. Chromatograph the residue consisting essentially of the epimeric 3-ols on a silica gel column. Elute with increasing percentages of ether in hexane. Combine like fractions (as evaluated by thin layer chromatography and infrared analysis) whereby separation into the epimeric 3-ols of this example is effected. Crystallize the separated fractions from acetone-hexane.

Alternatively these epimers are obtainable by utilizing pyridine as the solvent medium according to the following:

Add a solution of 0.92 mg. of 5α-1(10)-estrene-3,17-dione in 17 ml. pyridine to a solution of 47 mg. of sodium borohydride in 63 ml. of pyridine. Allow to stand 1–2 hours and then pour into water. Extract with methylene chloride, separate the epimeric 3-ols chromatographically as described above.

(F) *17α-ethinyl - 5α-1(10)-estrene-3β,17β-diol.*—To a stirred solution of 2.5 g. 5α-1(10)-estrene-3β-ol-17-one and 50 ml. dimethylsulfoxide add a suspension of sodium acetylide (20%) in xylene (volume of 22 ml.). Allow to stand at room temperature for 30 minutes and then pour slowly into 750 ml. of ice water. Saturate the aqueous phase with sodium chloride and extract with methylene chloride. Evaporate the organic phase to yield a residue consisting essentially of 17α - ethinyl-5α-1(10)-estrene 3β,17β-diol which may be used without further purification. If desired, it may be crystallized from acetone-hexane. By substituting the 3α-hydroxy epimer in the foregoing reaction the corresponding 17α-ethinyl-5α-1(10)-estrene-3α,17β-diol is obtained.

(G) *17α-ethinyl - 5α-1(10) - estrene-17β-ol-3-one.*—To 200 mg. of 17α-ethinyl-5α-1(10)-estrene-3β,17β-diol (or the 3α-hydroxy epimer) in 80 ml. of acetone, maintained at approximately 5° C. under an atmosphere of argon, add 0.6 ml. chromic acid solution (prepared as in 1D). After 25 minutes, pour into water and extract the resulting mixture. Evaporate the organic layer under an atmosphere of argon to a residue consisting essentially of 17α-ethinyl-5α-1(10)-estrene-17β-ol-3-one. Purification is effected by crystallization from acetone-hexane.

A still further method of preparing the compound of this example is that utilizing 5α-1-estrene-3,17-dione according to the following:

Dissolve 0.5 g. of 5α-1-estrene-3,17-dione in 10 ml. dimethylsulfoxide. Add 4.4 ml. of sodium acetylide in xylene (20% weight to volume) under an atmosphere of argon. Stir 30 minutes at room temperature. Pour the mixture onto 200 g. ice and water. Saturate with sodium chloride and extract with methylene chloride. Wash extracts with water and evaporate in vacuo under nitrogen. Crystallize the residue from acetone-hexane and obtain 17α-ethinyl-5α-1(10)-estrene-17β-ol-3-one.

Alternatively, the epimeric 3-ols of Section F of this example are prepared as follows:

Cool a solution of 1.0 g. of 17α-ethinyl-5α-1(10)-estrene-17β-ol-3-one (obtained for example as in 1C) in 90 ml. of methanol to 3° C. while stirring. Add a solution of 0.5 g. of sodium borohydride in 25 ml. methanol keeping the reaction temperature below 10° C. Stir at 5° C. for about 1 hour. Add 40 ml. of 50% aqueous acetone and remove the organic solvents by distillation. Extract with methylene chloride and evaporate to a residue. Separate the epimers at C-3 by chromatographing on silica gel as described in 1E.

If lithium aluminum hydride is employed as reducing agent the steroid (0.5 g.) is dissolved in 40 ml. of tetrahydrofuran and added dropwise to a stirred suspension of 0.5 g. of lithium aluminum hydride in 25 ml. of ether. After stirring for 3 hours at room temperature, the excess hydride reagent is destroyed by the dropwise addition of aqueous tetrahydrofuran. The organic solvents are removed by distillation and the insoluble solid material extracted into methylene chloride. The methylene chloride solution of the epimeric alcohols is evaporated and the residue chromatographed as above.

EXAMPLE 2

*17α-methyl-5α-1(10)-estrene-17β-ol-3-one*

(A) *17α-methyl-5α-1(10)-estrene-3β,17β-diol.* — Heat a solution of 1.5 g. of 5α-1(10)-estrene-3β-ol-17-one, 300 ml. benzene and 21 ml. of 4 N methyl magnesium bromide under reflux for 24 hours. Pour onto ice water and hydrochloric acid and extract with methylene chloride. Evaporate the organic extract to a residue comprising essentially 17α-methyl-5α-1(10)-estrene-3β,17β-diol. Purify by crystallizing from hexane.

(B) *17α-methyl-5α-1(10)-estrene-17β-ol-3-one.* — To 200 mg. 17α-methyl-5α-1(10)-estrene-3β,17β-diol in 60 ml. acetone maintained at 5° C., under an argon atmosphere, add 0.6 ml. chromic acid solution (26 g. $CrO_3$, 23 ml. conc. $H_2SO_4$ diluted to 100 ml. with water). After 10 minutes, pour the reaction solution into water, and extract with methylene chloride. Wash the organic layer with water and evaporate under an argon atmosphere to a residue comprising 17α-methyl-5α-1(10)-estrene-17β-ol-3-one. Purify by crystallization from acetone-hexane.

This compound is also prepared by substituting the 3α-ol epimer in part A obtaining 17α-methyl-1(10)-estrene-3α,17β-diol which is oxidized as above described.

EXAMPLE 3

*17α-ethyl-5α-1(10)-estrene-17β-ol-3-one*

(A) *17α-ethyl-5α-1(10)-estrene-3β,17β-diol.* — To a solution of 3.5 g. of 5α-1(10)-estrene-3β-ol-17-one in 225 ml. benzene add a twenty-five fold excess of ethyl lithium in hexane. After 23 hours at room temperature, add ice water and separate the organic layer. Evaporate this layer to a residue consisting essentially of the diol of this example. Purify by chromatography on activated magnesium silicate.

(B) *17α-ethyl-5α-1(10)-estrene-17β-ol-3-one.*—To 200 mg. of 17α-ethyl-5α-1(10)-estrene-3β,17β-diol in 60 ml. acetone maintained at approximately 5° C. under an argon atmosphere add 0.6 ml. of chromic acid solution (26 g. $CrO_3$, 23 ml. conc. $H_2SO_4$ diluted to 100 ml. with water). After 15 minutes, pour the reaction solution into water and extract the resulting precipitate with methylene chloride. Evaporate the organic phase under an inert atmosphere (argon) obtaining a residue comprising essentially of 17α - ethyl-5α-1(10)-estrene-17β-ol-3-one, which is purified by crystallization from acetonehexane. Similarly by utilizing the 3α-epimer in part A there is obtained 17α-ethyl-5α-1(10)-estrene-3α,17β-diol which is oxidized as described herein to the compound of this example.

EXAMPLE 4

*17α-vinyl-5α-1(10)-estrene-17β-ol-3-one*

To a solution of 0.298 g. (1 mole) of 17α-ethinyl-5α-1(2)-estrene-17β-ol-3-one (from 1B) in 40 ml. of anhy- Z' is >C=O, this function is reduced in the reaction so that in the resulting intermediate (J), Z is

Oxidation of the thus formed 17β-hydroxyl group in J via an Oppenauer oxidation results in a 17-keto analog which may then be subjected to Grignard reaction or reactions with alkali metal acetylides to yield either the 17β-hydroxy-17α-lower alkyl or 17β-hydroxy-17α-ethinyl analogs of J, respectively, i.e. those compounds wherein Z is

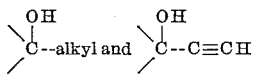

Compound (L) 13-ethyl-17α-ethinyl-4-gonene-17β-ol-3-one, is prepared either by acid treatment (such as with sulfuric or hydrochloric acid in methanol) of 3-methoxy-13 - ethyl - 17α ethinyl - 2,5(10) - gonadiene - 17β - ol (J prepared as in Example 10C of this application) or by similar acid treatment of the known 13-ethyl-17α-ethinyl-5(10)gonene-17β-ol-3-one (K) which in turn may be derived by mild acid treatment of the corresponding 3-methoxy-2,5(10)-gonadiene. Reduction with lithium in ammonia of 13-ethyl-17α-ethinyl-4-gonene-17β-ol-3-one (L) yields the desired 13-ethyl-17α-ethinyl-5α-gonane-17β-ol-3-one (A') which upon bromination, followed by dehydrobromination and deconjugation of the thereby produced 13 - ethyl - 17α - ethinyl - 5α - 1 - gonene - 17β-ol-3-one (C) according to the procedure outlined as reaction scheme A–D yields the compound of our invention 13 - ethyl - 17α - ethinyl - 5α - 1(10) - gonene - 17β-ol-3-one (D–3).

It is apparent from the foregoing that the necessary precursor for preparing the 5α-1-gonene (C) starting compounds of our process are 3-methoxy-13-W-17-Z-2,5(10)-gonadienes of formula J which are, in turn, derived from the 3-methoxy-13-W-17-Z-1,3,5(10)-gonatrienes of Formula I. The higher homologs of the compounds of structure I, i.e. those wherein W is ethyl, n or iso-propyl, n or isobutyl, and the like, are prepared by reduction of the corresponding 8,14-bis-dehydro analogs according to procedures described by H. Smith et al., Experientia 19, 394 (1963). Thus, 3-methoxy-13-n-propyl-1,3,5(10),8,14-gonapentaene-17-one and the corresponding 13-n-butyl analog thereof, upon selective hydrogenation with a 2% palladized calcium carbonate catalyst in benzene yields the corresponding 1,3,5(10),8-tetraenes which are converted by known procedures such as that utilizing lithium in aniline with liquid ammonia to give 3-methoxy-13-n-propyl-1,3,5(10)-gonatriene-17β-ol (I) and the 13-n-butyl analog thereof. Reaction of these 13-n-propyl and 13-n-butyl precursors according to sequences (I→A', A→D) and others as herein described yields 17-Z-13-n-propyl-5α-1(10)-gonenes of Formula D.

The starting material, E, for the series of reactions E→D (1,2 and 3) is prepared by oxidation of a 13-alkyl-5α-1(10)-gonene-17β-ol-3-one with chromic acid yielding the corresponding 13-alkyl-5α-1(10)-gonene-3,17-dione. Selective reduction of the dione with sodium borohydride, for example, results in the formation of E.

In preparing esters of the end products (e.g. D–1, D–2 and D–3) we prefer not to esterify the 3-keto-13-alkyl-5α-1(10)-gonene in view of the danger of enol acylation of the 3-keto group. This risk is incurred because of the presence of the 1(10)-double bond. Where esters are desired we prefer to insert the ester group at an earlier stage in the reaction sequence when the A-ring contains a 3-keto-1(2)-dehydro system. Thus, the 17-esters of precursors such as the 17α-methyl, 17α-ethyl and 17α-ethinyl analogs of 3-keto-5α-1(2)-estrene-17β-ol, for example, are first prepared by reacting the 17-hydroxy substance with an appropriate esterification agent (acetic anhydride in pyridine, for example) and then converting the α(β)-unsaturated ketone to the β(γ)-unsaturated ketone, D. The 3-keto-13-alkyl-5α-1(2)-gonene-17β-ols are prepared in a manner analogous to that described above for the preparation of E and transformation thereof by utilizing 3-keto-1(2)-estrene-17β-ol as starting material.

In effecting transformations on a 17-keto intermediate such as described above (i.e. E→D-1, 2, 3), it is important that isolated reactive keto groups present elsewhere in the molecule be protected lest such a group itself react with, for example, the Grignard reagent or ethynation agent. On the other hand, we have utilized the reactivity of a keto group in preparing 17α-ethinyl-5α-1(10)-estrene-3-one-17β-ol by subjecting 5α-1(2)-estrene-3,17-dione to the action of sodium acetylide whereby reaction of the 17-keto group occurs along with shifting of the 1(2)-double bond to the 1(10)-position.

The 5α-1(10)-dehydro-3-hydroxy intermediates (both α- and β-configuration) of this invention are generally prepared by reduction of the corresponding ketone as described in the examples which follow. Esterification is carried out as described. The following examples are illustrative of methods of preparing the novel compounds of this invention.

EXAMPLE 1

*17α-ethinyl-5α-1(10)-estrene-17β-ol-3-one*

(A) *2 - bromo-17-α-ethinyl-5α-estrane-17β-ol-3-one.*—Dissolve 300 mg. of 17α-ethinyl-5α-estrane-17β-ol-3-one in a solution consisting of 6 ml. dioxane, 0.42 ml. of acetic acid and 0.18 ml. water. Maintain solution temperature of 25° C. and add 0.405 ml. 30% hydrogen bromide in acetic acid. Add rapidly a solution of 160 mg. of bromine in 2.0 ml. of acetic acid-dioxane (10;90). Stir 15 minutes and pour into 100 ml. 2% aqueous potassium acetate. Filter. (The precipitate (1A) (360 mg.) is utilized in the next step without further purification.)

(B) *17α - ethinyl-5α- 1-estrene-17β-ol-3-one.*—Dissolve 360 mg. of the 2-bromo compound (1A) in 7.3 ml. of dimethylformamide. Add 181 mg. each of lithium bromide and lithium carbonate. Heat at 100° C. for 16 hours. Cool and pour into 1% aqueous hydrogen chloride. Filter the precipitate (225 mg.) and purify by chromatography on 8 g. of magnesium silicate (Florisil) eluting with hexane-ether combinations containing increasing quantities of ether. Combine the like eluates from the 5% through 25% ether content elutions (the like content of these eluates is determined spectroscopically). Concentrate the pool to a residue and crystallize from hexane-ether obtaining 56 mg. of 17α-thinyl-5α-1-estrene-17β-ol-3-one, M.P. 182–184° C.,[α]$_D^{25}$+66.9° (Dioxane).

(C) *17α-ethinyl-5α-1(10)-estrene-17β-ol-3-one.* — Dissolve 0.5 g. of 17α-ethinyl-5α-1-estrene-17β-ol-3-one in 10 ml. of dimethylsulfoxide. Blanket the solution with nitrogen and add 4.4 ml. of sodium acetylide in xylene (20% weight to volume). Stir 1 hour at room temperature, pour mixture onto 200 g. ice and water. Saturate with sodium chloride and extract with methylene chloride. Wash extracts with water and then dry over magnesium sulfate. Evaporate in vacuo under nitrogen. Crystallize the residue from acetone-hexane (under a blanket of argon) to obtain 17α-ethinyl-5α-1(10)-estrene-17β-ol-3-one.

Alternatively, the compound of this example may be prepared via 5α-1(10)-estrene-3β-ol-17-one as follows:

(D) *5α-1(10)-estrene-3,17-dione.*—To 200 mg. of 5α- drous pyridine add 0.175 g. of 5% palladium on calcium carbonate. Hydrogenate at atmospheric pressure and room temperature until the hydrogen uptake is 1 mole. Remove the catalyst by filtration and pour the filtrate into ice and hydrochloric acid. Extract with methylene chloride. Evaporate to a residue and crystallize from acetone-hexane obtaining the vinyl compound, 17α-vinyl-5α-1(2)-estrene-17β-ol-3-one.

Deconjugate by means of sodium acetylide in dimethylsulfoxide as described in Example 1F, obtaining 17α-vinyl-5α-1(10)-estrene-17β-ol-3-one. Purify by crystallization from acetonehexane.

EXAMPLE 5

*17α-chloroethinyl-5α-1(10)-estrene-17β-ol-3-one*

(A) *17α-chloroethinyl-5α-estrane-17β-ol-3-one.* — Add as rapidly as possible 1 g. of 17α-chloroethinyl-4-estrene-17β-ol-3-one dissolved in 50 ml. of tetrahydrofuran to a blue solution of 0.5 g. of lithium in 150 ml. of liquid ammonia. Stir for 5 minutes; then cautiously add solid ammonium chloride until the blue color disappears. Allow the ammonia to evaporate; then add water to the resultant residue and extract with methylene dichloride. Evaporate the combined extracts to a residue comprising 17α-chloroethinyl-5α-estrane-17β-ol-3-one. Purify by crystallization from acetone-hexane.

(B) *2-bromo - 17α - chloroethinyl-5α-estrane-17β-ol-3-one.*—In a manner similar to that described in Example 1A, treat 17α-chloroethinyl-5α-estrane-17β-ol-3-one with bromine and 30% hydrogen bromide in acetic acid and isolate the resultant product in the described manner to give 2-bromo - 17α - chloroethinyl-5α-estrane-17β-ol-3-one which is used without further purification in the following procedure.

(C) *17α-chloroethinyl-5α-1-estrene-17β-ol-3-one.*—In a manner similar to that described in Example 1B, treat a solution of 2-bromo-17α-chloroethinyl-5α-estrane-17β-ol-3-one in dimethylformamide with lithium bromide and lithium carbonate. Isolate and purify the resultant product in the described manner to give 17α-chloroethinyl-5α-1-estrene-17β-ol-3-one.

(D) *17α-chloroethinyl - 5α - 1(10) - estrene-17β-ol-3-one.*—In a manner similar to that described in Example 1C, treat 17α-chloroethinyl-5α-1-estrene-17β-ol-3-one with sodium acetylide in dimethylsulfoxide. Isolate and purify the resultant product in the described manner to obtain 17α-chloroethinyl-5α-1(10)-estrene-17β-ol-3-one.

EXAMPLE 6

*17α-ethinyl-5α-1(10)-estrene-17β-ol-3-one 17-acetate*

(A) *17α-ethinyl-5α-1(2)-estrene-17β-ol-3-one 17-acetate.*—Add 2 ml. of pyridine and 1 ml. of acetic anhydride to 1 g. of 17α-ethinyl-5α-1-estrene-17β-ol-3-one. Heat at reflux for 20 hours. Add the reaction solution to water and extract the resulting mixture with methylene chloride. Separate the organic layer and wash with water, then evaporate to a residue. Crystallize from acetone-hexane to yield the acetate ester.

(B) *17α-ethinyl-5α-1(10)-estrene-17β-ol-3-one 17-acetate.*—Dissolve 0.5 g. of 17α-ethinyl-5α-1(2)-estrene-17β-ol-3-one 17-acetate in 10 ml. dimethylformamide. Blanket the solution with argon and add 4.7 ml. of sodium acetylide in xylene (20% weight to volume). Stir for 15 minutes at room temperature, then pour the mixture onto 200 g. ice and water. Extract the resulting mixture with methylene chloride. Wash the methylene chloride extract with water and then evaporate in vacuo under nitrogen. Crystallize the residue from acetone-hexane under a blanket of argon to obtain 17α-ethinyl-5α-1(10)-estrene-17β-ol-3-one 17-acetate.

By substituting other esterifying agents for the acetic anhydride in part A of this example, such as propionic anhydride or benzoyl chloride (or the acid chlorides of the respective carboxylic acids at room temperature), other corresponding esters are prepared.

This esterification procedure is equally applicable to the preparation of 17β-esters of 17α-lower alkyl, alkenyl and halo-lower alkynyl 17β-hydroxy compounds described herein.

EXAMPLE 7

*17α-ethinyl-5α-1(10)-estrene-3β,17β-diol 3-acetate*

Add 0.5 g. 17α-ethinyl-5α-1(10)-estrene-3,β,17β-diol to a solution of 5 ml. of pyridine and 1 ml. of acetic anhydride. Stir at room temperature for 12–24 hours and then added water. Collect the precipitate and dry at 60° C. Crystallize the 3β-acetate ester of this example from acetone-hexane.

By substituting the 3α-ol epimer in the foregoing, the corresponding 3α-acetate is obtained.

EXAMPLE 8

*17α-ethinyl-5α-1(10)-estrene-3β,17β-diol diacetate*

Perform the reaction of Example 7 at 95° C. utilizing twice the quantity of acetic anhydride. Cool, pour into water and extract with methylene chloride. Wash the methylene chloride solution in turn with water, dilute hydrochloric acid and then water. Evaporate to a residue consisting of the diacetate of this example. Crystallize from aqueous methanol.

By utilizing the 3α-epimer in the foregoing the corresponding 3α,17β-diacetate is obtained.

EXAMPLE 9

*17α-ethinyl-5α-1(10)-estrene-3β,17β-diol 3-butyrate*

Add a solution of butyryl chloride (0.21 g.) in 2 ml. of pyridine to a solution of 17α-ethinyl-5α-1(10)-estrene-3β,17β-diol (0.5 g.) in 3 ml. of pyridine. Keep the reaction temperature between 0° and 5° C. Allow the solution to warm to room temperature and after two hours pour into ice and hydrochloric acid. Isolate and purify in the manner of Example 8 obtaining the 3-butyrate ester of this example.

In similar manner the 3α-epimer yields the 3α-butyrate.

By utilizing an excess of butyryl chloride the 3,17-dibutyrate is obtained from the above reaction.

The foregoing examples pertaining to the manufacture of esters are present by way of illustration only. It is obvious that by replacing the ethinyl sterol with another made herein, such as a 17α-methyl-17β-ol, the corresponding esters of such compounds are similarly prepared.

EXAMPLE 10

*13-ethyl-17α-ethinyl-4-gonene-17β-ol-3-one*

(A) *3 - methoxy-13-ethyl-2,5(10)-gonadiene-17β-ol.*—Add a solution of 600 mg. of 3-methoxy-13-ethyl-1,3,5 (10)-gonatriene-17-one in 18 ml. of dioxane and 5 ml. of ethanol to 160 ml. of ammonia. Then add 900 mg. of lithium. After the lithium has dissolved evaporate the ammonia from the reaction solution; then add water. Filter the resultant precipitate comprising 3-methoxy-13-ethyl-2,5(10)-gonadiene-17β-ol. Purify by crystallization from acetone-hexane.

(B) *3 - methoxy-13-ethyl-2,5(10)-gonadiene-17-one.*—Add 3 g. of aluminum isopropoxide in 38 ml. of dry toluene to a solution of 2.2 g. of 3-methoxy-13-ethyl-2,5 (10)-gonadiene-17β-ol in 26 ml. of cyclohexanone and 93 ml. of toluene. Reflux for 2½ hours; then add 20 ml. of a saturated solution of potassium sodium tartrate. Dilute the reaction mixture with water; then separate the organic phase and evaporate to a residue comprising 3-methoxy-13-ethyl-2,5(10)-gonadiene-17-one. Purify by crystallization from aqueous methanol.

(C) *3 - methoxy-13-ethyl-17α-ethinyl-2,5(10)-gonadiene-17β-ol.*—Under an atmosphere of nitrogen, add 4.5 ml. of an 18% suspension of sodium acetylide in xylene to a solution consisting of 0.25 g. of 3-methoxy-13-ethyl-2,5(10)-gonadiene-17-one in 10 ml. of dimethylsulfoxide. Stir the reaction mixture under nitrogen at room temperature for 1 hour; then pour the reaction mixture into ice water and extract with methylene chloride. Evaporate the combined methylene extracts to a residue comprising 3 - methoxy-13-ethyl-17α-ethinyl-2,5(10)-gonadiene-17β-ol. Purify by crystallization from acetone-hexane.

(D) *13 - ethyl-17α-ethinyl-4-gonene-17β-ol-3-one.*—To a solution of 100 mg. of 3-methoxy-13-ethyl-17α-ethinyl-2,5(10)-gonadiene-17β-ol in 35 ml. of methanol, add 30 ml. of 2% aqueous sulfuric acid solution. Warm the reaction mixture at 50° C. for three hours; then cool and add sufficient aqueous potassium bicarbonate to neutralize the reaction mixture. Concentrate the neutralized mixture in a stream of nitrogen to a volume of approximately 5 ml.; then add water and filter the resultant precipitate of 13 - ethyl-17α-ethinyl-4-gonene-17β-ol-3-one. Purify by crystallization from acetone-hexane.

Alternatively, the compound of this example is prepared as follows: to a solution of 100 mg. of 3-methoxy-13-ethyl-17α-ethinyl-2,5(10)-gonadiene-17β-ol in 35 ml. of methanol, add 3 ml. of a 2% aqueous sulfuric acid solution. Allow the reaction mixture to remain at room temperature for 35 minutes; then add sufficient aqueous potassium bicarbonate to neutralize the sulfuric acid solution. Concentrate the neutralized mixture in a stream of nitrogen to a volume of approximately 5 ml.; then add water and filter the resultant precipitate of 13-ethyl-17α-ethinyl-5(10)-gonene-17β-ol-3-one. Purify by crystallization from acetone-hexane. Treatment of the 13-ethyl-5(10)-gonene derivative thus prepared with sulfuric acid-methanol in the manner described in the first paragraph of this example yields 13-ethyl-17α-ethinyl-4-gonene-17β-ol-3-one.

EXAMPLE 11

*13-ethyl-17α-ethinyl-5α-1(10)-gonene-17β-ol-3-one*

(A) *13 - ethyl - 17α - ethinyl - 5α - gonane - 17β - ol-3-one.*—Add as rapidly as possible 1 g. of 13-ethyl-17α-ethinyl-4-gonene-17β-ol-3-one dissolved in 50 ml. of tetrahydrofuran to a blue solution of 0.5 g. of lithium in 150 ml. of liquid ammonia. Stir for 5 minutes; then cautiously add solid ammonium chloride until the blue color disappears. Allow the ammonia to evaporate; then add water to the resultant residue and extract with methylene chloride. Evaporate the combined extracts to a residue comprising 13-ethyl-17α-ethinyl-5α-gonane-17β-ol-3-one.

(B) *2 - bromo - 13 - ethyl - 17α - ethinyl - 5α - gonane-17β-ol-3-one.*—In a manner similar to that described in Example 1A, treat 13-ethyl-17α-ethinyl-5α-gonane-17β-ol-3-one with bromine and 30% hydrogen bromide in acetic acid. Isolate the resultant product in the described manner to give 2-bromo-13-ethyl-17α-ethinyl-5α-gonane-17β-ol-3-one which is used without further purification in the following procedure.

(C) *13 - ethyl - 17α - ethinyl - 5α - 1 - gonene - 17β-ol-3-one.*—In a manner similar to that described in Example 1B, treat a dimethylformamide solution of 2-bromo-13-ethyl-17α-ethinyl-5α-gonane-17β-ol-3-one with lithium bromide and lithium carbonate. Isolate and purify the resultant product in a manner similar to that described to give 13-ethyl-17α-ethinyl-5α-1-gonene-17β-ol-3-one.

(D) *13 - ethyl - 17α - ethinyl - 5α - 1(10) - gonene-17β-ol-3-one.*—In a manner similar to that described in Example 1C, treat a dimethylsulfoxide solution of 13-ethyl-17α-ethinyl-5α-1-gonene-17β-ol-3-one with sodium acetylide in xylene under an atmosphere of nitrogen. Isolate and purify the resultant product in a manner similar to that described to give 13-ethyl-17α-ethinyl-5α-1(10)-gonene-17β-ol-3-one.

EXAMPLE 12

*13-ethyl-17α-ethinyl-5α-1(10)-gonene-3,17β-diol*

Cool a solution of 1 g. of 13-ethyl-17α-ethinyl-5α-1(10)-gonene-17β-ol-3-one in 90 ml. of methanol to 3° C. while stirring. Add a solution of 0.5 g. of sodium borohydride in 25 ml. of methanol keeping the reaction temperature below 10° C. Stir at 5° C. for about 1 hour. Add 40 ml. of 40% aqueous acetone and remove the organic solvents. Extract with methylene chloride and evaporate the combined extracts to a residue. Separate the epimers at C-3 by chromatography on silica gel in the manner described in Example 1E to obtain 13-ethyl-17α-ethinyl-5α-1(10)-gonene-3β,17β-diol and 13-ethyl-17α-ethinyl-5α-1(10)-gonene-3α,17β-diol respectively.

We claim:

1. 3-R-13-lower alkyl-5α-1(10)-gonenes having at the 17α-position a member of the group consisting of lower alkyl, lower alkenyl, lower alkynyl, and halogeno lower alkynyl and at the 17β-position a member of the group consisting of hydroxy and an acyloxy radical of a hydrocarbon carboxylic acid having up to eight carbon atoms; wherein R is a member of the group consisting of keto, hydroxy and acyloxy, the acyl portion of which is that of a hydrocarbon carboxylic acid having up to eight carbon atoms.

2. A compound of the group consisting of 3-R-17α-R'-13-lower alkyl-17β-hydroxy-5α-1(10)-gonenes and esters thereof, the acyl portion of the ester being that of a hydrocarbon carboxylic acid having up to eight carbon atoms, wherein R' is a member of the group consisting of lower alkyl, lower alkenyl, lower alkynyl, and halo-lower alkynyl and R is a member of the group consisting of keto and hydroxy.

3. A compound of claim 2 wherein R is keto, R' is ethinyl, and 13-lower alkyl is 13-methyl, said compound having the name 17α-ethinyl-17β-hydroxy-3-keto-5α-1(10)-estrene.

4. A compound of claim 2 wherein R is keto, R' is methyl, and 13-lower alkyl is 13-methyl, said compound having the name 17α-methyl-17β-hydroxy-3-keto-5α-1(10)-estrene.

5. A compound of claim 2 wherein R is keto, R' is ethyl, 13-lower alkyl is 13-methyl, said compound having the name 17α-ethyl-17β-hydroxy-3-keto-5α-1(10)-estrene.

6. A compound of claim 2 wherein R is keto, R' is lower alkyl, and 13-lower alkyl is 13-methyl, said compound having the name 17α-lower alkyl-17β-hydroxy-3-keto-5α-1(10)-estrene.

7. A compound of claim 2 wherein R is keto, R' is alkinyl, and 13-lower alkyl is 13-methyl, said compound having the name 17α-lower alkynyl-17β-hydroxy-3-keto-5α-1(10)-estrene.

8. 3,17-diketo-5α-1(10)-estrene.

9. A compound of claim 2 wherein R is hydroxy, R' is lower alkynyl, and 13-lower alkyl is 13-methyl, said compound having the name 17α-lower alkynyl-3,17β-dihydroxy-5α-1(10)-estrene.

10. A compound of claim 2 wherein R is hydroxy, R' is lower alkyl, and 13-lower alkyl is 13-methyl, said compound having the name 17α-lower alkyl-3,17β-dihydroxy-5α-1(10)-estrene.

11. A hydrocarbon carboxylic acid ester having up to eight carbon atoms of 17α-lower alkynyl-3,17β-dihydroxy-5α-1(10)-estrene.

12. A hydrocarbon carboxylic acid ester having up to eight carbon atoms of 17α-lower alkyl-3,17β-dihydroxy-5α-1(10)-estrene.

13. In the process for preparing a 3-R-13-lower alkyl-5α-1(10)-gonene having at the 17α-position a member of the group consisting of lower alkyl, lower alkenyl, lower alkynyl, and halogeno lower alkynyl and at the 17β-position a member of the group consisting of hydroxy and acyloxy, the acyl portion of which is that of a hydrocarbon carboxylic acid having up to eight carbon atoms wherein R is a member of the group consisting of keto, hydroxy and acyloxy, the acyl portion of which is that of a hydrocarbon carboxylic acid having up to eight carbon atoms, the step which comprises contacting a 3-keto-13-lower alkyl-5α-1(2)-gonene with an alkali metal acetylide in a solvent selected from the group consisting of dimethylformamide and dimethylsulfoxide.

References Cited by the Examiner

UNITED STATES PATENTS 3,156,711   11/1964   Cross et al. _____ 260—397.5

OTHER REFERENCES

Fishman: "Chemistry and Industry," (1962), pages 1467–1468 relied on.

LEWIS GOTTS, *Primary Examiner.*

ELBERT L. ROBERTS, *Examiner.*